3,494,875
POROUS SILICA BODIES AND METHOD
Madeleine Le Page, Paris, and Germaine Pineau,
  Boulogne, France, assignors to Produits Chimiques
  Pechiney-Saint Gobain, Paris, France
No Drawing. Filed Apr. 16, 1968, Ser. No. 721,599
Claims priority, application France, Apr. 26, 1967,
  104,249
Int. Cl. B01j 11/40; C01b 33/00
U.S. Cl. 252—454                                7 Claims

ABSTRACT OF THE DISCLOSURE

The preparation of silica bodies of large porous volume in which particles of silica gel are first impregnated with a solution of a compound or compounds which yield fluorine and calcining the impregnated silica gel at a temperature within the range of up to 1250° C. in which the compound from which the fluorine is derived is represented by hydrofluoric acid, a soluble fluoride, fluosilicic acid, a fluosilicate and a fluosilicate containing sodium.

---

This invention relates to porous bodies of large porous volume formed of silica containing fluorine.

In the copending applications Ser. No. 610,749, filed Jan. 23, 1967, entitled "Porous Silica Grains and Method for Manufacture," Ser. No. 610,786, filed Jan. 23, 1967, entitled "Porous Silica Containing Foreign Atoms and Method for Preparation of Same," and Ser. No. 610,787, filed Jan. 23, 1967, entitled "Porous Silica Particles Containing a Crystallized Phase and Method," description is made of the fabrication of grains of silica gel, in the form of fragments or balls, containing different amounts of foreign atoms. When calcined, such grains present textures and structures which vary, depending somewhat on calcination temperature. The diversity of the structure and texture of the grains, as well as the stability of their properties make such grains well suited for many applications such as in catalysis and absorption.

It is also known that gelation of silica sols having added hydrofluoric acid or, more generally, alkaline fluorides, yields silica substances of greater porosity and a specific surface, after drying, of the order of hundreds of m.²/g.

On the one hand, the processes of the aforementioned copending applications do not yield grains of all of the desired porosity ranges, especially low specific surfaces, and, on the other hand, the previously recommended silica sols containing fluorides, after gelation and drying, yield silica substances having specific surfaces which are too large for some applications. Many of the latter have many drawbacks, such as modification of gelation time due to the addition of fluorine, which interferes with the use of some of the forming processes and the need very rapidly to differentiate a part of the fabrication of an industrial system which yields large differences in product, since one is obliged to make up sols of special compositions.

It has now been found, in accordance with the practice of this invention, that calcination of silica gel, impregnated with compounds that yield fluorine, at temperatures up to 1250° C., permits silica bodies of large porous volume to be obtained, the porosity repartition of which is precisely defined, as well as the specific surface relating to the calcination temperature. Compounds which yield fluorine, which may be used in the practice of this invention, can be represented by hydrofluoric acid, fluosilicic acid, as well as fluorides and soluble fluosilicates.

The silica bodies prepared in accordance with the described process of this invention represent a new industrial product characterized by large porous volume as well as the application of such silica bodies in catalysis and absorption.

Description will hereinafter be made of the practice of this invention by way of examples for treating silica gel globules and molded substances of silica gel with substances that yield fluor, either in the form of an acid or salt, containing ions of sodium, the action of which together with the fluorine, permits a very large diversity of the porous repartition within different ranges to be obtained with a porous volume that is very great.

EXAMPLE 1

Silica hydrogel globules of 10% silica and having a diameter within the range of 6 to 10 mm. are contacted for one hour with a solution of 0.5% by volume hydrofluoric acid, then washed with distilled water and dried at 100° C. Their specific surface measures 480 m.²/g. and their porous volume is 0.70 cm.³/g. The globules are subdivided into several increments for calcination in air for one hour at different temperatures ranging from 600° to 1200° C. Determinations are made of the specific surface, the porous volume, the medium ray of the globules and the porous ray repartition. The results are set forth in the following Table I:

TABLE I

| Calcination temperature, ° C. | Specific surface, m.²/g. | Porous volume, cm.³/g. | Medium pores ray in A. | Repartition of porous rays in A. |
|---|---|---|---|---|
| 600 | 380 | 0.70 | 35 | Pores lower than 100 A. |
| 700 | 14.4 | 0.69 | 800 | 400 to 1,500. |
| 800 | 9.0 | 0.70 | 1,200 | 700 to 2,000. |
| 900 | 4.0 | 0.63 | 2,500 | 1,500 to 5,000. |
| 1,000 | 3.5 | 0.67 | 3,200 | 2,000 to 7,000. |
| 1,100 | 2.7 | 0.63 | 4,500 | 2,500 to 9,000. |
| 1,200 | 1.7 | 0.70 | 7,000 | 3,500 to 10,000. |

This table shows that increase in calcination temperature favors decrease of the specific surface. The porous volume decreases much less proportionally and the porous repartition can be precisely adjusted by means of calcination temperature.

EXAMPLE 2

Dried silica globules having a diameter of 3 to 5 mm. are placed in contact with an aqueous solution containing 3.2% by weight sodium fluoride for three hours, then the globules are filtered on a Büchner funnel and dried in a drying oven at 150° C. The globules are subdivided into increments for calcination at different temperatures for one hour. For each calcination temperature, the same characteristics as those mentioned in the preceding example are determined and set forth in the following Table II:

TABLE II

| Calcination temperature, ° C. | Specific surface, m.²/g. | Porous volume, cm.³/g. | Medium pores ray in A. | Repartition of porous rays in A. |
|---|---|---|---|---|
| 600 | 60 | 0.67 | 180 | 100–350 |
| 700 | 5 | 0.66 | 2,000 | 800–3,000 |
| 800 | 1.2 | 0.60 | 6,500 | 3,000–15,000 |
| 900 | 1.1 | 0.60 | 8,000 | 4,000–20,000 |

This table shows that the impregnation of the silica gel globules with sodium fluoride solution enables a large porous volume to be maintained for any calcination temperature while, at the same time, obtaining porous repartition in pores having great sizes at calcination temperatures less than when the globules are treated only by hydrofluoric acid.

EXAMPLE 3

This example concerns the calcination at different temperatures of cylindrical agglomerates of silica gel which measure 6 mm. x 6 mm. in the dry state and which are obtained by molding silica hydrogel and impregnating with solutions of sodium fluoride of different concentrations in order to obtain molded cylindrical agglomerates having different contents of NaF. In the following Table III the characteristics determined for the calcinated agglomerates in air for one hour at different temperatures are shown:

TABLE III

| Naf contents of the molded agglomerates, percent | T° of calcination, °C. | Specific surface, m.²/g. | Porous volume, cm.³/g. | Medium pores ray, A. | Repartition of porous rays, A. |
|---|---|---|---|---|---|
| 0.67 | 200 | 330 | 0.93 | 53 | Inf. to 90. |
|  | 500 | 325 | 0.84 | 49 | Inf. to 90. |
|  | 600 | 325 | 0.88 | 51 | Inf. to 90. |
|  | 700 | 290 | 0.85 | 55 | Inf. to 90. |
|  | 800 | 110 | 0.71 | 120 | Inf. to 150. |
|  | 900 | 15 | 0.49 | 350 | 200 to 800. |
| 1.12 | 200 | 300 | 0.92 | 58 | Inf. to 80. |
|  | 500 | 260 | 0.91 | 66 | Inf. to 80. |
|  | 600 | 230 | 0.89 | 70 | Inf. to 80. |
|  | 700 | 140 | 0.77 | 100 | Inf. to 300. |
|  | 800 | 6.3 | 0.83 | 2,000 | 700 to 4,000. |
|  | 900 | 3.5 | 0.82 | 1,900 | 700 to 5,000. |
|  | 1000 | 1.0 | 0.26 | 1,900 | 1,000 to 4,000. |
| 2.55 | 200 | 240 | 0.87 | 72 | Inf. to 80. |
|  | 500 | 220 | 0.85 | 77 | Inf. to 80. |
|  | 600 | 155 | 0.83 | 100 | Inf. to 150. |
|  | 650 | 80 | 0.90 | 140 | 75 to 400. |
|  | 700 | 32 | 0.90 | 3,300 | 2,500 to 5,000. |
|  | 800 | 0.5 | 0.68 | 25,000 | 9,000 to 60,000. |
|  | 900 |  | 0.86 | 30,000 | 20,000 to 60,000. |
| 3.4 | 200 | 205 | 0.84 | 82 | Inf. to 70. |
|  | 500 | 190 | 0.84 | 89 | Inf. to 70. |
|  | 600 | 130 | 0.87 | 95 | Inf. to 150. |
|  | 650 |  | 0.92 | 240 | 100 to 600. |
|  | 700 | 4.9 | 0.94 | 2,000 | 1,000 to 3,500. |
|  | 800 | 0.6 | (0.67) | 20,000 | 7,000 to 40,000. |
|  | 900 | 0.3 | 0.89 | 35,000 | 20,000 to 60,000. |
| 5 | 200 | 200 | 0.77 | 77 | Inf. to 75. |
|  | 600 | 60 | 0.67 | 180 | 90 to 350. |
|  | 700 | 5.0 | 0.66 | 2,000 | 800 to 4,000. |
|  | 800 | 1.2 | 0.60 | 6,500 | 3,000 to 10,000. |
|  | 900 | 1.2 | 0.60 | 8,000 | 4,000 to 15,000. |

These tests show that increase in content of NaF permits increasing medium porous rays to be obtained. From a practical standpoint, it is unnecessary to exceed 3% by weight of NaF which corresponds at medium rays of about 30,000 A. units for a calcination at 900° C., while keeping a very large porous volume.

EXAMPLE 4

The same molded cylindrical agglomerates as prepared in the preceding example are impregnated with a solution of fluosilicate in which sodium is present in a concentration of 2 g. per 100 g. of water. After filtration on a Büchner funnel and drying at 150° C. ,these substances are found to contain approximately 0.4% by weight of Na and 1% by weight of F. The calcination of the substances at temperatures ranging from 800° to 1000° C. give the following results which are set forth in Table IV.

TABLE IV

| Calcination temperature, °C. | Porous volume, cm.³/g. | Medium ray pores, A. | Repartition of the porous rays, A. |
|---|---|---|---|
| 800 | 0.74 | 1,100 | 500–2,000 |
| 900 | 0.69 | 1,900 | 800–5,000 |
| 1,000 | 0.48 | 2,200 | 800–5,000 |

This table shows that fluosilicate of sodium has an action similar to that of hydrofluoric acid alone.

The preceding examples are given by way of illustration and not by way of limitation of this invention. Numerous variants can be made without limitation of the invention concerning silica gel submitted to impregnation, the nature of the impregnation substances, or the manner for impregnation of the silica gel. Thus, the silica gel can be in the form of crushed fragments, the action of sodium can be replaced by that of other metals, particularly alkaline metals, and finally, several impregnations can be employed with the same solutions or with different solutions or with solutions of different substances which yield fluorine.

It will be understood that other changes may be made in the details of formulation and operation without departing from the spirit of the invention, especially as defined in the following claims.

We claim:

1. A process for the preparation of silica bodies of large porous volume comprising the steps of impregnating silica gel with a fluor-yielding compound from the group consisting of hydrofluoric acid and its soluble fluorides and fluosilicic acid and its soluble fluosilicates and calcining the impregnated silica gel at a temperature range above 600° C. up to 1250° C.

2. The process as claimed in claim 1 in which the silica gel is impregnated with a solution of hydrofluoric acid.

3. The process as claimed in claim 1 in which the silica gel is impregnated with a solution of a soluble fluoride.

4. The process as claimed in claim 1 in which the silica gel is impregnated with fluosilicic acid.

5. The process as claimed in claim 1 in which the silica gel is impregnated with a soluble fluosilicate.

6. The process as claimed in claim 5 in which the silica gel is impregnated with a solution of soluble fluosilicate containing sodium ion.

7. A silica body having a high porous volume prepared by the process of claim 1.

References Cited

UNITED STATES PATENTS

| 2,059,811 | 11/1936 | Sauer | 23—182 |
| 2,506,923 | 5/1950 | Hoekstra | 252—451 |
| 2,794,002 | 5/1957 | Haensel et al. | 252—441 |
| 3,243,262 | 3/1966 | Carr et al. | 23—182 |

DANIEL E. WYMAN, Primary Examiner

C. F. DEES, Assistant Examiner

U.S. Cl. X.R.

252—449; 23—182